US010904913B2

(12) United States Patent
Kim et al.

(10) Patent No.: US 10,904,913 B2
(45) Date of Patent: Jan. 26, 2021

(54) METHODS AND APPARATUS FOR CONTROL CHANNEL SCHEDULING IN WIRELESS COMMUNICATIONS

(71) Applicant: QUALCOMM Incorporated, San Diego, CA (US)

(72) Inventors: Tae Min Kim, San Diego, CA (US); Jing Lin, Milpitas, CA (US); Arvind Santhanam, San Diego, CA (US); Timothy Pals, San Diego, CA (US); Subramanya Rao, Sunnyvale, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/059,670

(22) Filed: Aug. 9, 2018

(65) Prior Publication Data
US 2019/0053267 A1 Feb. 14, 2019

Related U.S. Application Data

(60) Provisional application No. 62/545,423, filed on Aug. 14, 2017.

(51) Int. Cl.
*H04W 72/12* (2009.01)
*H04W 92/18* (2009.01)
(Continued)

(52) U.S. Cl.
CPC ... *H04W 72/1294* (2013.01); *H04W 72/0406* (2013.01); *H04W 72/121* (2013.01);
(Continued)

(58) Field of Classification Search
None
See application file for complete search history.

(56) References Cited

U.S. PATENT DOCUMENTS

2015/0271840 A1* 9/2015 Tavildar .............. H04L 1/08
370/329
2017/0188381 A1* 6/2017 Lopes Batista ....... H04W 8/005
(Continued)

FOREIGN PATENT DOCUMENTS

WO    2018063061 A1    4/2018

OTHER PUBLICATIONS

Interdigital Communications: "Support of Different Priorities for D2D Communication", 3GPP Draft; R1-154730 IDCC Prose Priority, 3rd Generation Partnership Project (3GPP), Mobile Competence Centre; 650, Route Des Lucioles; F-06921 Sophia-Antipolis Cedex; France, vol. RAN WG1, No. Beijing, China; Aug. 24, 2015-Aug. 28, 2015, Aug. 14, 2015 (Aug. 14, 2015), pp. 1-5, XP050992739, Retrieved from the Internet: URL: http://www.3gpp.org/ftp/tsg_ran/WG1_RL1/TSGR1_82/Docs/ [retrieved on Aug. 14, 2015].

(Continued)

*Primary Examiner* — Scott M Sciacca
(74) *Attorney, Agent, or Firm* — Arent Fox, LLP

(57) ABSTRACT

Various aspects related to control channel (e.g., PSCCH) scheduling/prioritizing techniques in wireless communications are described. When a UE may not be able to decode various PSCCH transmissions detected in a subframe, a subset of the PSCCHs may be selected for decoding based on the described methods. In accordance with one aspect, a UE may determine that a total number of PSCCH transmissions in a subframe is greater than a number of PSCCH transmissions that can be decoded within the subframe. Upon such a determination, the UE may select at least one PSCCH transmission in the subframe for decoding based on at least one of: retransmission information, information regarding a transmitting UE associated with the at least one PSCCH transmission, or scheduling priority history associ- (Continued)

ated with a sub-channel carrying the at least one PSCCH transmission. The UE may then decode the at least one PSCCH transmission selected for decoding.

30 Claims, 8 Drawing Sheets

(51) Int. Cl.
H04W 72/04 (2009.01)
H04W 76/14 (2018.01)
H04L 5/00 (2006.01)
H04W 4/40 (2018.01)
H04L 1/18 (2006.01)

(52) U.S. Cl.
CPC ....... *H04W 72/1242* (2013.01); *H04W 76/14* (2018.02); *H04L 1/1896* (2013.01); *H04L 5/001* (2013.01); *H04L 5/005* (2013.01); *H04L 5/0051* (2013.01); *H04L 5/0053* (2013.01); *H04L 5/0055* (2013.01); *H04L 5/0057* (2013.01); *H04W 4/40* (2018.02); *H04W 72/0446* (2013.01); *H04W 92/18* (2013.01)

(56) References Cited

U.S. PATENT DOCUMENTS

2019/0174530 A1* 6/2019 Kim ................ H04W 72/1289
2019/0200370 A1* 6/2019 Yang .................. H04L 5/0053

OTHER PUBLICATIONS

International Search Report and Written Opinion—PCT/US2018/046253—ISA/EPO—dated Nov. 7, 2018.
LG Electronics: "Remaining Issues for PC5 V2V", 3GPP Draft; R1-1702394 Remaining Issues on PC5 V2V, 3rd Generation Partnership Project (3GPP), Mobile Competence Centre ; 650, Route Des Lucioles; F-06921 Sophia-Cedex; France, vol. RAN WG1, No. Athens, Greece; Feb. 13, 2017-Feb. 17, 2017, Feb. 12, 2017 (Feb. 12, 2017), pp. 1-6, XP051209548, Retrieved from the Internet: URL: http://www.3gpp.org/ftp/Meetings_3GPP_SYNC/RAN1/Docs/ [retrieved on Feb. 12, 2017].
Samsung: "On TBS and Soft Buffer Size", 3GPP Draft; R1-1703463 TB Size, 3rd Generation Partnership Project (3GPP), Mobile Competence Centre; 650, Route Des Lucioles; F-06921 Sophia Antipolis Cedex; France, vol. RAN WG1, No. Athens, Greece; Feb. 13, 2017-Feb. 17, 2017, Feb. 16, 2017 (Feb. 16, 2017), pp. 1-3, XP051236512, Retrieved from the Internet: URL: http://www.3gpp.org/ftp/tsg_ran/WG1_RL1/TSGR1_88/Docs/ [retrieved on Feb. 16, 2017].

* cited by examiner

METHODS AND APPARATUS FOR CONTROL CHANNEL SCHEDULING IN WIRELESS COMMUNICATIONS

CROSS-REFERENCE TO RELATED APPLICATION(S)

This application claims the benefit of U.S. Provisional Application Ser. No. 62/545,423 entitled "PHYSICAL SIDELINK CONTROL CHANNEL SCHEDULING IN VEHICLE TO EVERYTHING COMMUNICATIONS" filed on Aug. 14, 2017, which is expressly incorporated by reference herein in its entirety.

FIELD

The present disclosure relates generally to communication systems, and more particularly, to methods and apparatus related to control and/or data channel scheduling and/or prioritization that may be used in wireless communications systems including, e.g., vehicle-to-everything (V2X) and/or vehicle-to-vehicle (V2V) communication systems.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

The automotive industry is evolving at a fast rate and so are the technical needs of the automotive industry including the need for effective vehicular communication. A number of communication industries and work groups are developing technologies to improve direct communication between vehicles as well as communication between vehicle and other entities. There exists a need for further improvements in vehicular communications. A device, e.g., a vehicle with wireless communication capability, may have some limitations in terms of a number of control channels that the device may decode in a given time period. There exists a need for methods and apparatus that improve scheduling and prioritization of control channels for decoding.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus that may be for V2V communication and/or V2X communication are provided. The apparatus may be a first user equipment (UE) (e.g., a vehicle). The apparatus may be configured to determine that a total number of physical sidelink control channel (PSCCH) transmissions in a subframe is greater than a number of PSCCH transmissions that can be decoded within the subframe. The apparatus may be further configured to select at least one PSCCH transmission in the subframe for decoding based on at least one of: retransmission information, information regarding a transmitting UE associated with the at least one PSCCH transmission, or scheduling priority history associated with a sub-channel carrying the at least one PSCCH transmission. The apparatus may be further configured to decode the at least one PSCCH transmission selected for decoding.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
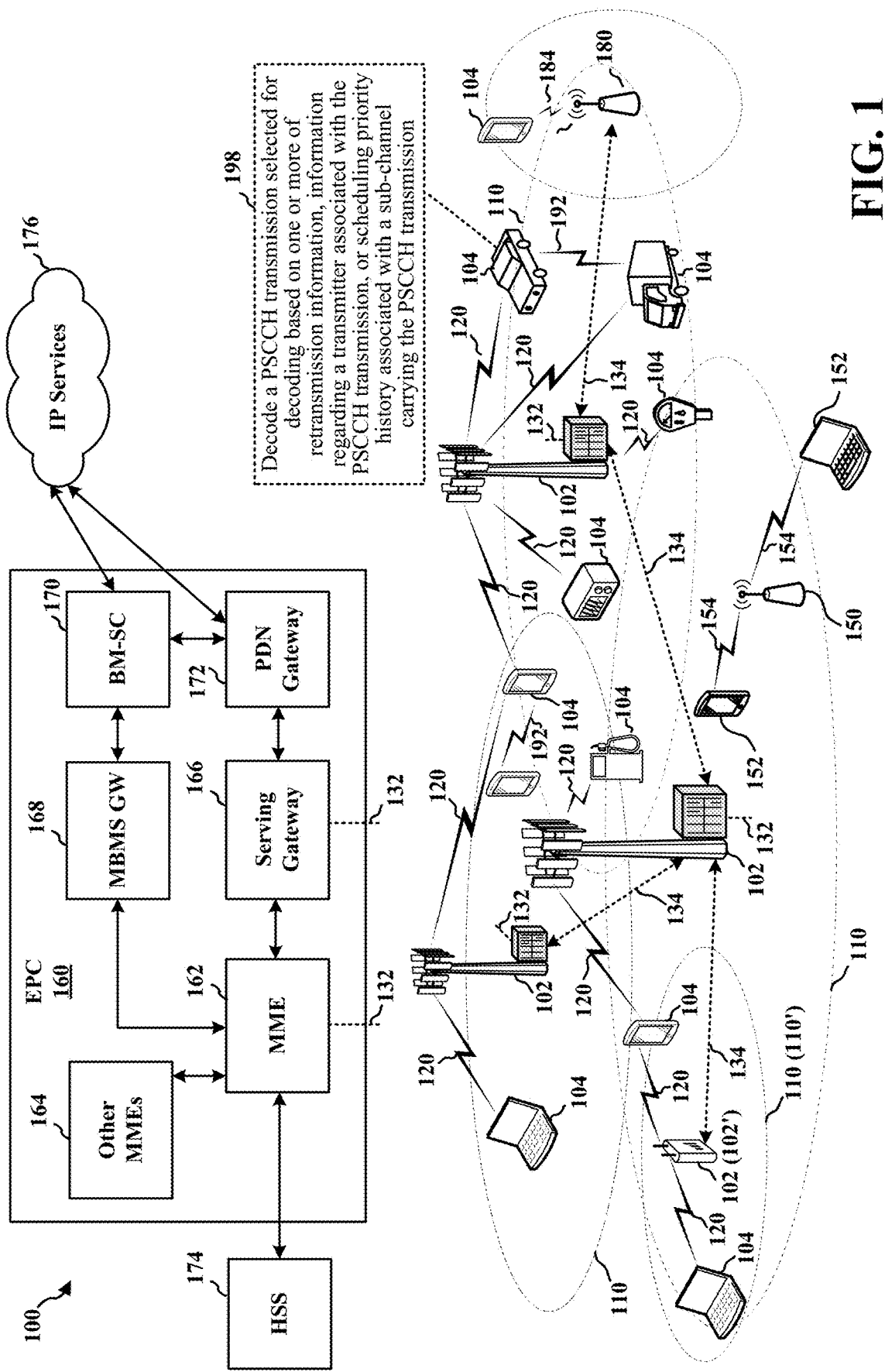
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media may include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device communication link 192. In some configurations, when the UEs 104 communicating with each other using the communication link 192 are vehicles (or where UEs 104 are implemented as part of vehicles), the communication link 192 may be a V2V communication link and the communicating UEs 104 (e.g., vehicles) may be said to be in V2V communication. Some of the UEs 104 communicate together in V2V communication using the DL/UL WWAN spectrum, some may communicate with the base station 102, and some may do both. Thus, the communication link 192 may use the DL/UL WWAN spectrum. The V2V communication may be through one or more sidelink channels, such as a physical sidelink broadcast channel (PSBCH), a physical sidelink discovery channel (PSDCH), a physical sidelink shared channel (PSSCH), and a physical sidelink control channel (PSCCH).

The exemplary methods and apparatuses discussed infra are applicable to any of a variety of wireless V2V communications systems, such as for example, a wireless vehicle-to-vehicle communication system based on FlashLinQ, WiMedia, Bluetooth, ZigBee, or Wi-Fi based on the IEEE 802.11 standard, LTE, or NR. To simplify the discussion, the exemplary methods and apparatus are discussed within the context of LTE. However, one of ordinary skill in the art would understand that the exemplary methods and apparatuses are applicable more generally to a variety of other wireless vehicle-to-vehicle communication systems.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to determine whether a total number of PSCCH transmissions in a subframe is greater than a number of PSCCH transmissions that can be decoded within the subframe. In certain aspects, when the total number of PSCCH transmissions in the subframe is determined to be greater than the number of PSCCH transmissions that can be decoded by the UE within the subframe, the UE 104 may select at least one PSCCH transmission in the subframe for decoding based on at least one of: retransmission information, information regarding a transmitting UE associated with the at least one PSCCH transmission, or scheduling priority history associated with a sub-channel carrying the at least one PSCCH transmission (198). The UE 104 may be further configured to decode (198) the at least one PSCCH transmission selected for decoding.

Figure 2:
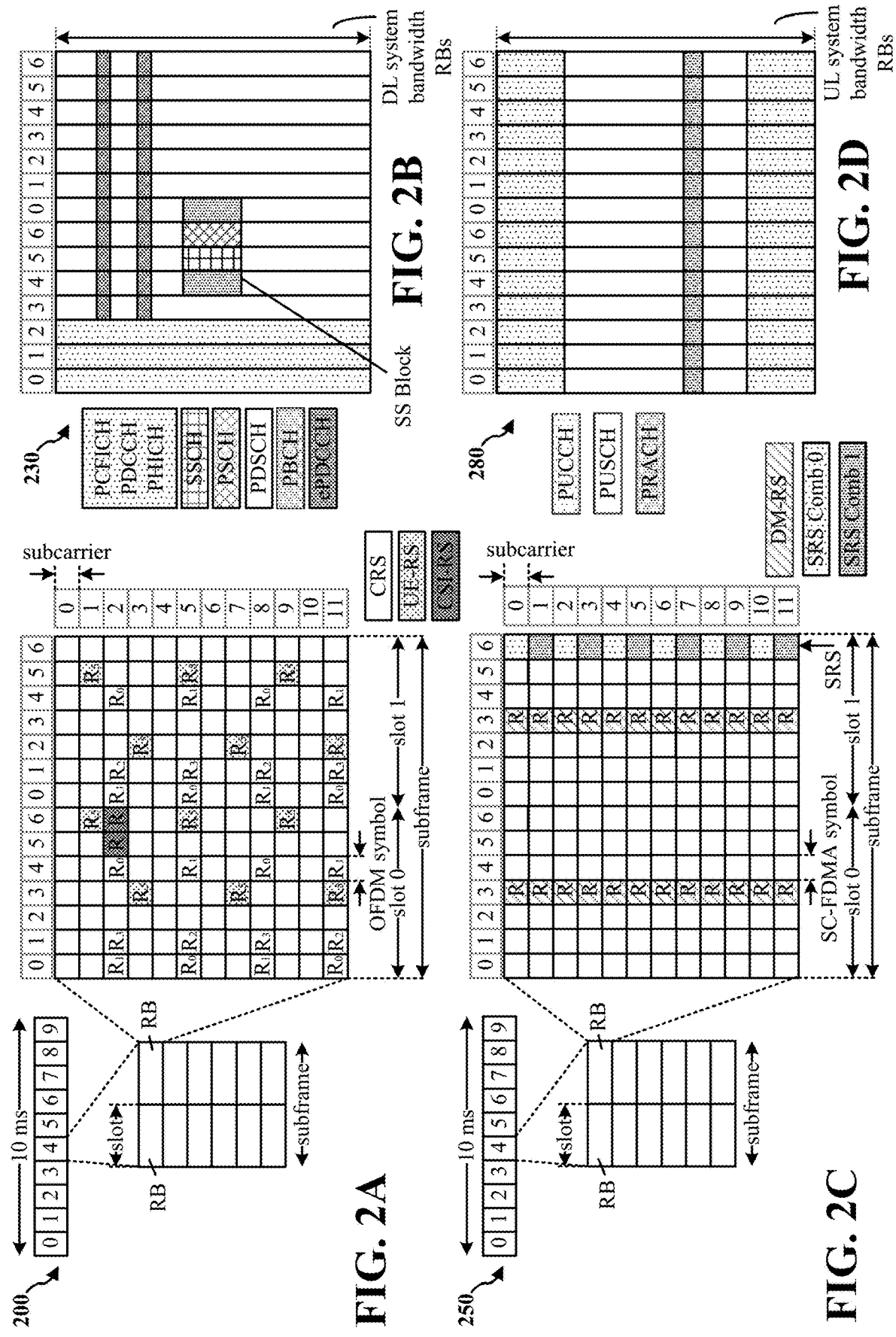
FIGS. 2A, 2B, 2C, and 2D are diagrams illustrating examples of a DL frame structure, DL channels within the DL frame structure, an UL frame structure, and UL channels within the UL frame structure, respectively.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
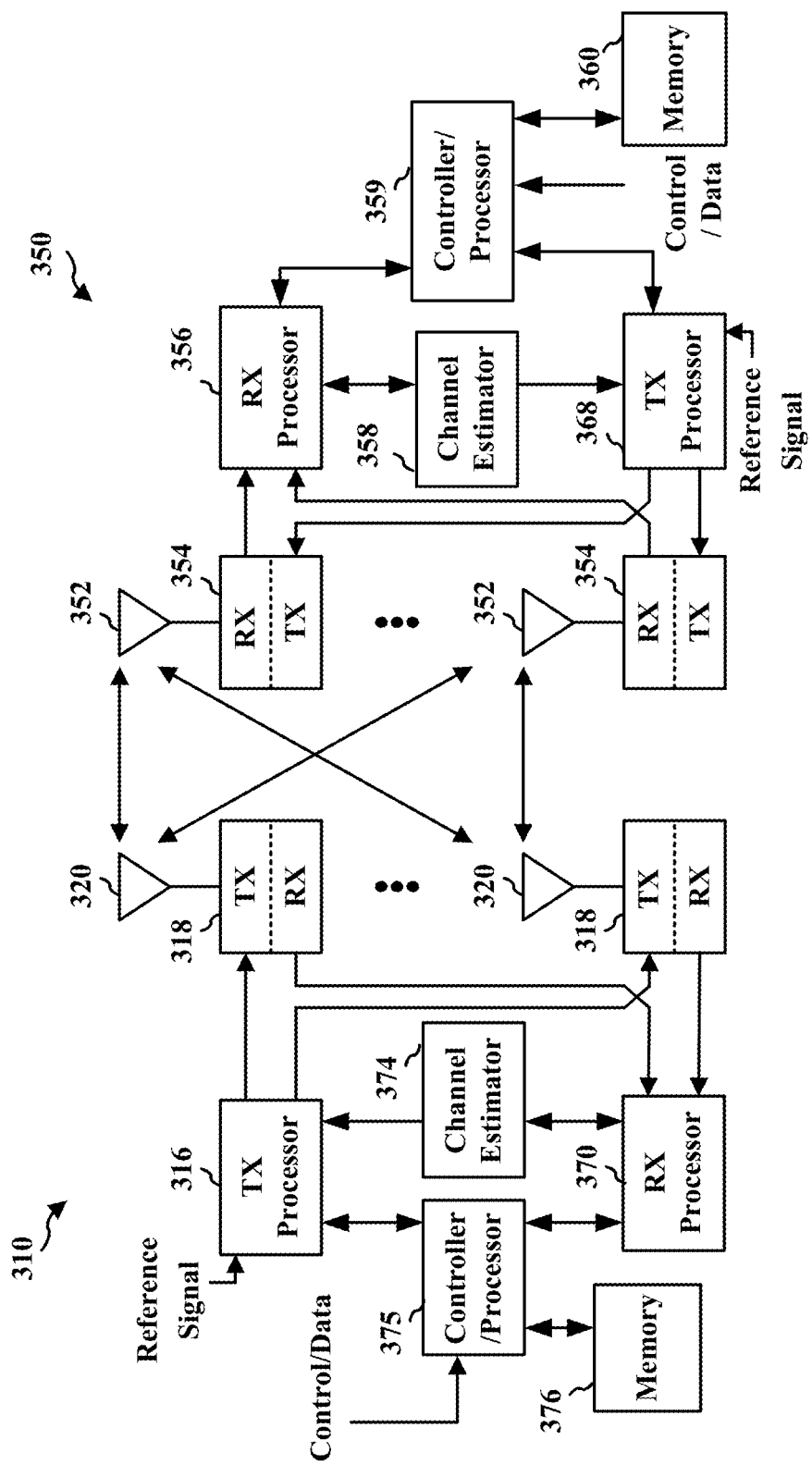
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Various aspects described herein relate to control channel (e.g., PSCCH) scheduling/prioritizing techniques in wireless communications including, e.g., V2V and V2X communications. When a UE (e.g., a vehicle or a communication device installed in a vehicle) is not capable of decoding all potential PSCCHs that the UE may detect/receive in a subframe (e.g., due to limited cycle budget and/or other limitations), in accordance with proposed techniques, a subset of the PSCCHs may be selected for decoding by the UE. The described methods and techniques allow for better utilization of available cycles to decode high priority PSCCH transmissions, thereby improving power efficiency, reliability and throughput of the UE.

In V2X Sidelink Transmission Mode 4, a control channel (e.g., PSCCH) and a data channel (e.g., PSSCH) may be transmitted concurrently in all subframes (SFs). The control and data channels may be allocated in adjacent or non-adjacent resource blocks (RBs). A UE may broadcast one PSCCH and one PSSCH per subframe, but can receive multiple PSCCHs/PSSCHs, e.g., transmitted on various RBs from various transmitting devices (for example neighboring vehicles). Based on higher layer configurations, a UE may determine an RB pool in which reception of PSCCH and PSSCH may occur, e.g., a preconfigured resource pool in which the UE may search for PSCCH and PSSCH transmission from other devices. An RB pool may include a number of sub-channels, each of which may comprise a set of contiguous RBs. PSCCH transmissions from other devices may be received in any of the sub-channels. In certain instances, a UE may be able to blindly decode PSCCH transmissions on all sub-channels in the RB pool within one subframe so that the UE does not miss any valid PSCCH transmission. However, due to a limited cycle budget for PSCCH/PSSCH demodulation/decoding, a UE may only decode a limited number of PSCCHs within one subframe. In view of the above discussed issues, it may be appreciated that there exists a need for methods and techniques for prioritizing PSCCHs for decoding, e.g., to allow the receiving UE to select a subset of the total number of sub-channels to decode PSCCH transmissions on the selected subset of sub-channels.

In existing systems, no specific algorithm has been defined for prioritizing PSCCH when using Sidelink Transmission Mode 4, and is UE implementation dependent. In one approach, a UE may select a random or constant subset of potential PSCCHs to decode. Such an approach however has negative impacts from the perspective of both power and performance. For example, a significant amount of power may be wasted on decoding non-important, redundant or even invalid PSCCH transmissions (which indicate where the associated PSSCH transmissions occur) and the associated PSSCH transmissions. Furthermore, power spent on decoding the first transmissions which fail a cyclic redundancy check (CRC) might also be wasted if the corresponding retransmissions are discarded, e.g., as being non-critical, redundant, or invalid. From the perspective of performance, it is possible that the PSCCH/PSSCH transmissions that carry important information may be excluded from the (randomly or constantly) selected subset, which may result in lower reliability. Moreover, the system throughput may suffer (e.g., decrease) when retransmissions are frequently discarded.

The PSCCH prioritization methods and techniques described herein address many drawbacks of conventional approaches and increase the overall power efficiency and/or performance of the system. In an aspect, the proposed methods exploit various a priori information on the expected PSCCH transmissions and the sub-channel scheduling statistics. The prior knowledge may enable a receiving UE (e.g., a vehicle monitoring to receive transmissions in the PSCCH from other vehicles) to distinguish non-critical, redundant and/or invalid PSCCH transmissions from other PSCCH transmissions that may significantly impact the overall system performance. Thus, utilizing the methods and related features described herein, the available cycle budget for PSCCH/PSSCH demodulation/decoding thus be better utilized to decode higher priority PSCCH transmissions.

Figure 4:
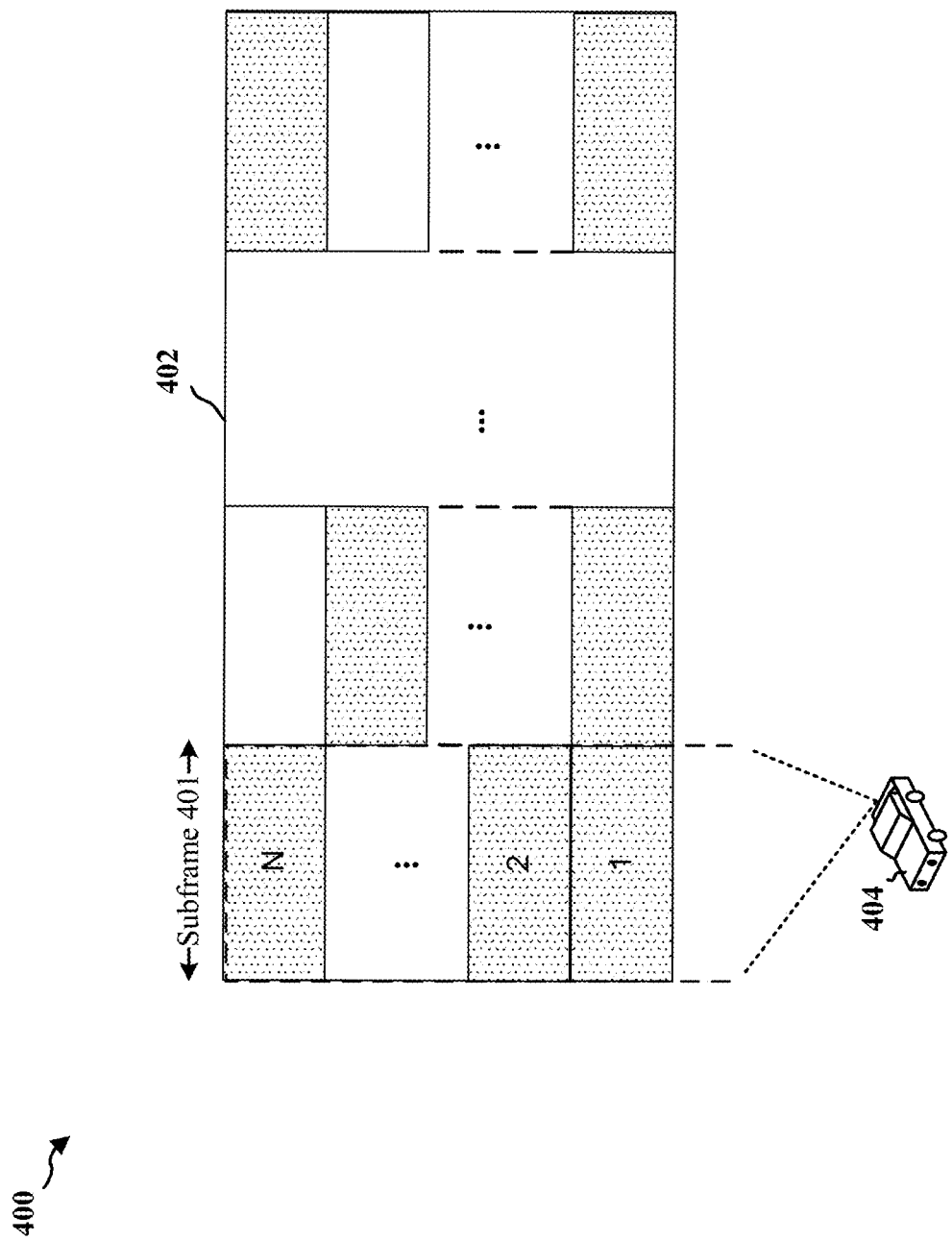
FIG. 4 illustrates an example of a receive resource pool including a number of sub-channels on which PSCCH/PSSCH transmissions may be expected to be received.

In one configuration, the PSCCH prioritization may be triggered when the total number of sub-channels (e.g., carrying PSCCH transmissions) in a receive RB resource pool is larger than the number of PSCCHs decodable within one subframe by a UE (e.g., based on decoding budget). For discussion purposes consider an example described below with respect to FIG. 4. FIG. 4 is a diagram 400 illustrating an example of a receive RB pool 402 including a number of sub-channels. The sub-channels of the RB pool 402 shown with the dotted fill pattern may carry PSCCH transmissions (e.g., V2V broadcast control messages on the PSCCH) from various transmitting UEs (e.g., vehicles). FIG. 4 also shows a UE 404 monitoring the sub-channels corresponding to a subframe 401 for PSCCH/PSSCH transmissions. As discussed earlier, the PSCCH transmissions from other devices may be received in the sub-channels 1 through N. While the UE 404 may detect a number of PSCCH transmissions (e.g., on various different sub-channels corresponding to the subframe) in the subframe 401, the UE 404 may be limited in the number of PSCCH transmissions in the subframe decodable by the UE due to limited cycle budget for PSCCH/PSSCH demodulation/decoding. In accordance with an aspect, the UE 404 may be configured to select one or more sub-channels of the total number of sub-channels corresponding to a given subframe where the UE 404 may perform PSCCH decoding (e.g., decode PSCCH transmissions on the selected sub-channels). The selected subset of the sub-channels may include certain sub-channels, e.g., where high priority/important PSCCH transmissions occur, and thus PSCCH decoding may be limited to the selected subset of sub-channels having high priority PSCCH transmissions and/or sub-channels that are deemed to carry PSCCH transmission satisfying certain criteria as discussed infra. Such prioritization of certain sub-channels where PSCCH decoding may be performed may increase power efficiency and performance of the UE by selecting a subset of sub-channels where PSCCH decoding is performed. The selection and prioritization of sub-channels (or the PSCCH transmissions on the sub-channels) may be based on prior knowledge of one or more of retransmission information, knowledge of the transmitting UEs, and long-term statistics of sub-channel utilization. Thus, in accordance with an aspect, the selection of the subset of the sub-channels on which PSCCH transmissions may be decoded may be based on one or more of retransmission information, knowledge regarding the transmitting UEs, and long-term statistics of sub-channel utilization. Based on the above information, the UE may determine a priority for each sub-channel, e.g., for the purposes of decoding PSCCH transmission on the sub-channel. In an aspect, in a limited PSCCH/PSSCH demodulation/decoding cycle budget scenario, sub-channels with the highest determined priorities may be selected for PSCCH decoding while low priority sub-channels may be ignored, i.e., PSCCH decoding may not be performed on low priority sub-channels when the UE is not capable of decoding all potential PSCCHs in a subframe. In other words, the UE may determine a priority for each PSCCH transmission detected by the UE when monitoring for PSCCH transmissions on the sub-channels of the receive RB pool channel, and may select one or more of the received PSCCH transmissions with highest determined priorities for decoding and/or further processing.

In an aspect, retransmission information for a PSCCH and the associated PSSCH may be used to prune or prioritize PSCCH decoding at a sub-channel. Unlike PDCCH/PDSCH in LTE downlink, sidelink transmission (e.g., used for V2V and V2X type communications) does not assign HARQ identifiers (IDs) to transmissions in the sidelink channels, nor does the sidelink transmission support ACK/NACK mechanism. Instead, indication of presence of the retransmission, and the subframe and RB locations for the retransmission (if the retransmission is present) may be encoded in the PSCCH payload in a first transmission, and the retransmission may occur regardless of first transmission CRC statistics (e.g., regardless of whether the first PSCCH transmission and/or associated PSSCH transmission are successfully decoded at the receiver). Thus, if the UE 404 successfully decoded the first PSCCH transmission, the sub-channel and subframe where the retransmission may occur may be known to the UE 404. In some configurations, the UE 404 may keep track of the retransmission information (e.g., determined from a first or previous PSCCH transmission) and the first transmission PSSCH CRC statistics to assign HARQ IDs and buffers accordingly. The HARQ buffers may be used to store log-likelihood ratios (LLRs) for the PSSCH payload of previous (e.g., first) PSSCH transmissions which failed decoding. The LLRs corresponding to a given PSSCH transmission, if properly stored in a HARQ buffer, may be used in decoding a retransmission of the previous PSSCH transmission for better/improved decoding (e.g., by combining LLRs from previous decoding with LLRs generated in a current decoding). For example, the LLRs corresponding to a first PSSCH transmission may be combined with LLRs corresponding to the PSSCH retransmission to obtain better decoding results (e.g., with higher probability of successful decoding) when decoding the PSSCH retransmission.

Thus, in various configurations, the UE may keep track of i) retransmission information corresponding to various PSCCH transmissions and associated PSSCH transmissions indicating where (e.g., subframe/RB location) the retransmission for each of the various PSCCHs and PSSCHs may occur, ii) decoding results for various previous PSCCHs and PSSCHs transmissions (e.g., CRC statistics for previous decoding attempts of the previous PSSCH transmissions, decoded data/LLRs from previous decoding attempts, etc.), and iii) whether a HARQ buffer was assigned to a previous transmission of a PSSCH. Such tracking/book-keeping (e.g., keeping track of the above discussed retransmission related information) may ensure HARQ combining of correct PSSCH pairs across subframes and RBs, and may also provide a priori knowledge on whether a PSCCH retransmission is expected and occurs at a particular sub-channel in a given subframe.

In accordance with an aspect, for a given subframe, based on the retransmission information, the UE 404 may be configured to start the PSCCH transmission decode prioritization by, e.g., considering the sub-channels on which PSCCH retransmission is expected. In one configuration, the UE 404 may prioritize PSCCH decode at a sub-channel (i.e., select PSCCH transmission on the sub-channel for decoding) based on whether one of more of the following conditions are satisfied: i) a PSCCH retransmission is expected on the sub-channel (e.g., the PSCCH transmission on the sub-channel is a retransmission), ii) a valid HARQ buffer was assigned to a previous transmission of an associated PSSCH (e.g., the PSSCH corresponding to the PSCCH), and iii) the previous transmission of the associated PSSCH failed a CRC. In one configuration, the UE 404 may prioritize PSCCH decode of the sub-channel if all of the above conditions are satisfied, e.g., the PSCCH transmission on the given sub-channel may be selected (out of the total (multiple) number of PSCCH transmissions on various other sub-channels in the given subframe) for decoding. In some other configurations, the UE 404 may prioritize PSCCH decode of the sub-channel if at least one or more of the above conditions is satisfied.

In some cases there may be multiple sub-channels corresponding to a subframe for which the above conditions are satisfied (e.g., there may be multiple PSCCH transmissions on different sub-channels in the subframe that satisfy the above discussed prioritization conditions). In such a case where multiple sub-channels satisfy the above described conditions, the scheduling priority of such sub-channels (for PSCCH decoding) may be further prioritized based on properties of the associated PSSCH transmission. For example, PSCCH decode on a given sub-channel may be scheduled first (e.g., prioritized) if the associated PSSCH carries higher priority messages, and/or has a larger number of RBs, and/or has a lower starting RB index, etc. The UE may determine priority of the associated PSSCH, number of RBs assigned for the PSSCH and/or the starting RB index for the PSSCH, e.g., based on the decoding of a previous (e.g., first/initial) PSCCH transmission. Such information may also be stored in a retransmission record corresponding to the PSCCH. If the previous/first PSCCH transmission has high priority (e.g., carried a high priority message), the retransmission of the PSSCH transmission may also be associated with high priority because the PSSCH retransmission has the same payload as the first PSSCH transmission.

On the other hand, a PSCCH transmission decode of a sub-channel may be pruned (e.g., relegated lower priority for decoding and/or ignored) if one or more of the following conditions are met: i) the PSCCH transmission is associated with a retransmitted PSSCH whose previous transmission passed CRC (e.g., determined based on CRC statistics for previous PSSCH decoding); or ii) the RB allocation for the associated PSSCH overlaps with the RB allocation of another PSSCH whose associated PSCCH has higher scheduling priority (as determined based on equations (1) and (2) discussed infra. With regard to the first condition for pruning, in some configurations, for a first PSCCH transmission on a given sub-channel, the UE 404 may be configured to determine if the first PSCCH transmission under consideration is associated with a retransmitted PSSCH. The determination may be based on, e.g., a stored record of retransmission information corresponding to the first PSCCH transmission (assuming the given current PSCCH transmission under consideration is a retransmission for which retransmission information is available from a previous PSCCH transmission decoding). Then the UE 404 may determine, e.g., based on stored CRC statistics for the previous PSSCH transmission decoding, if the previous transmission of the PSSCH passed a CRC. If it is determined that the previous PSSCH transmission decoding was successful, the UE may conclude that there may be no need to decode the current PSCCH as there may be no need to decode the associated PSSCH which is a retransmission of a previous successfully decoded PSSCH transmission. Accordingly, in such a case the UE 404 may be configured to prune/skip decoding of the PSCCH transmission under consideration, e.g., in favor of better utilization of the decoding cycle budget to allow decoding of another PSCCH.

With regard to the second condition for pruning, in some configurations, for a first PSCCH transmission on a given sub-channel, the UE 404 may be configured to determine if the RB allocation for the associated PSSCH overlaps with the RB allocation of another (e.g., second) PSSCH whose associated PSSCH has higher scheduling priority. Again, such a determination may be made when the current PSCCH transmission (under consideration for decode scheduling) is a retransmission of a previous PSCCH transmission which was successfully decoded. Because the RB allocation for the retransmission of the associated PSSCH is indicated in the previous PSCCH transmission which was successfully decoded by the UE 404, the UE 404 may use such knowledge from the previous PSCCH decode to make the determination. In such a case if the UE 404 determines, based on the retransmission information, information from the decoding of the previous PSCCH transmission, and/or knowledge of scheduling priorities of various PSCCH transmissions, that the RB allocation for the PSSCH transmission (associated with the current (first) PSCCH transmission under consideration) overlaps with the RB allocation of another PSSCH whose associated (second) PSCCH has higher scheduling priority, then the UE 404 may prune the first PSCCH transmission under consideration (e.g., decide not to decode the first PSCCH).

In accordance with another aspect, the UE 404 may utilize knowledge regarding a transmitting UE to prune or prioritize PSCCH decoding on a sub-channel. For example, information regarding a transmitting UE may be used to determine whether to prioritize a PSCCH transmission from the transmitting UE for decoding or prune/ignore the PSCCH transmission on the sub-channel. In V2X/V2V communications, information received from different UEs may have (e.g., be associated with) different threat levels. For example, messages from a vehicle on the opposite side of a freeway might not be as critical (e.g., have low threat level) as the messages from a nearby vehicle on the same side of the freeway (e.g., have high threat level). Because V2V devices use a semi-persistent scheduling (SPS) for transmissions (e.g., a V2V device may use the same set of resources for transmitting V2V messages rather than dynamically changing resources for every transmission), a receiving UE (e.g., UE 404) may predict reception of PSCCH/PSSCH transmissions from a specific transmitting UE in a particular sub-channel/subframe. Thus, based on the use of semi-persistent scheduling for V2V/V2X type communications and history of previous transmissions received from various UEs, the receiving UE 404 may determine that a given PSCCH/PSSCH transmission on a given sub-channel/subframe is from a particular transmitting UE. Furthermore, the threat metric of the particular transmitting UE may be obtained from higher/upper layers (e.g., service layer/MAC layer/ML1). For example, a high threat metric (obtained by the receiving UE 404 from higher layers) of the particular transmitting UE may indicate that transmissions from the particular UE are important/ critical and/or associated with a higher/lower threat level (e.g., messages may carry important or critical information helpful in accident avoidance, improving travel safety, better traffic management, etc.). Given such information (regarding the transmitting UE and/or the threat level associated with the transmissions from the transmitting UE), a sub-channel in a subframe may be pruned (e.g., sub-channel carrying a PSCCH transmission may be ignored or relegated lower priority for decoding) if the sub-channel is expected to carry PSCCH transmission from a low threat UE. That is, the sub-channel in a subframe may be pruned based on the PSCCH transmission.

In an aspect, remaining sub-channels (e.g., sub-channels corresponding to a given subframe that have not been prioritized or pruned yet) may be ranked according to accumulative long-term statistics of valid PSCCH transmissions scheduled in each sub-channel over the past few subframes. For example, consider that $C_m(n)$ denotes the priority of sub-channel m in subframe n. This priority may be evaluated by higher layers (of the UE) based on long-term statistics of each sub-channel such as average sub-channel occupancy and the frequency of high threat PSCCH transmissions in the sub-channel.

$C_m(n)$ may be reset, for example, once every predetermined period of time to either a constant or a sub-channel dependent value. Let $A_m(t)$ be the indicator of whether a new PSCCH transmission is scheduled on sub-channel m in subframe t. More specifically, $A_m(t)=1$ if PSCCH transmission is scheduled and the PSCCH transmission is not a retransmission, $A_m(t)=0$ if PSCCH transmission is scheduled but the transmission is a retransmission, and $A_m(t)=-1$ if PSCCH transmission is not scheduled. In one aspect, $s_m(n)$ may be defined as the moving average of $A_m(t)$ observed in subframe n, e.g., $$s_m(n) = \max\left(s, \frac{1}{T} \sum_{t=min(0,n-T)}^{n-1} A_m(t)\right), \quad (1)$$

$s_m(n)$ may be initialized to 1, and lower-bounded by some positive number s that is smaller than 1, and reset once every predetermined period. In equation (1), "T" may be the time period over which the moving average is determined. To prioritize decoding sub-channels that have frequently carried important (e.g., high priority) PSCCH transmissions while providing fairness among sub-channels, the overall scheduling priority of sub-channel m in subframe n may be defined as:

$$p_m(n)=C_m(n)/s_m(n) \quad (2),$$

From the above equation (2), it may be observed that lower $p_m(n)$ for a given sub-channel indicates lower overall scheduling priority for the given sub-channel. Thus, the sub-channels with lower $p_m(n)$ may be pruned if needed or desired.

Figure 5:
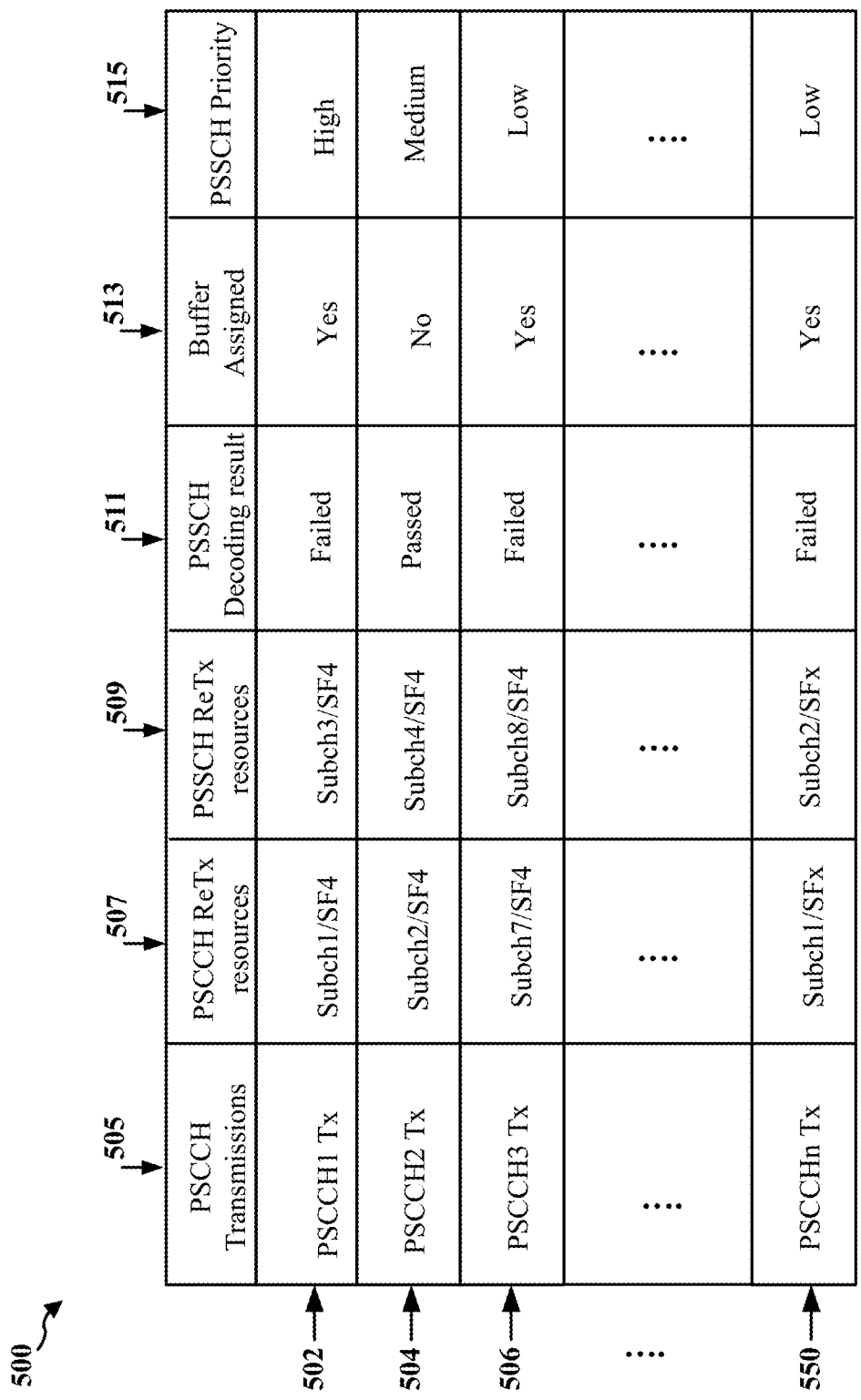
FIG. 5 is a diagram illustrating an example of retransmission information shown in a tabular form, in accordance with one configuration.

FIG. 5 is a diagram illustrating an example retransmission information 500 in a tabular form, in accordance with one configuration. The retransmission information (also referred to herein as ReTx info) 500 may be generated and populated by a UE (e.g., 404) based on sensing and decoding of PSCCH channels over time. The retransmission information 500 may include retransmission information records (e.g., each row 502, 504, 506, . . . , 550 indicates an individual retransmission record) corresponding to various initial PSCCH transmissions (e.g., new PSCCH transmissions that are not retransmissions). Each retransmission information record associated with an initial/first PSCCH transmission may include information/parameters (as illustrated in columns 507, 509, 511, 513, 515) indicating, for example, the resources (e.g., sub-channels/RB locations, subframe identifier) on which a retransmission of the initial PSCCH transmission may occur, the resources on which a retransmission of an associated initial PSSCH transmission may occur (e.g., sub-channels/RB locations, subframe identifier, number of RBs assigned for the PSSCH and/or the starting RB index for the PSSCH), decoding result/statistics corresponding to the associated initial PSSCH transmission, whether a buffer was assigned to store decoded data (e.g., LLRs) corresponding to the initial PSSCH transmission based on an attempted decoding, and a priority of the initial PSSCH transmission.

As shown the first row 502 corresponds to a retransmission record for a first control channel, e.g., PSCCH1, identified by the entry in the first column 505. Each entry in the respective columns 507, 509, 511, 513, 515 corresponding to the first row 502 indicates information corresponding to PSCCH1. For example, the first entry in column 507 corresponding to the first row 502 indicates that a retransmission of the initial/first PSCCH1 transmission may occur in sub-channel 1 of subframe 4. As an example, the first entry in column 509 corresponding to the first row 502 indicates that a retransmission of an associated initial PSSCH (e.g., PSSCH1) transmission may occur in sub-channel 3 of subframe 4. The first entry in column 511 corresponding to the first row 502 indicates that the initial PSSCH (PSSCH1) transmission associated with PSCCH1 failed decoding. For example, the UE 404 receiving the initial PSSCH1 transmission may decode the received PSSCH1 transmission, run a CRC and determine that the decoding failed based on the CRC result. Based on the determination, the UE 404 may populate the field for decoding result in column 511. The first entry in column 513 corresponding to the first row 502 indicates that a buffer was assigned to store decoded data (e.g., LLRs) corresponding to the initial PSSCH1 transmission associated with PSCCH1. The first entry in column 515 corresponding to the first row 502 indicates that the priority of the initial PSSCH1 transmission associated with PSCCH1 is high. In some configurations, the priority of the initial PSSCH transmission may indicate relative importance of the PSSCH transmission, e.g., whether the PSSCH transmission communicates important or high priority message. In some configurations, one or more bits (e.g., 3 bits in one particular example) in the initial PSCCH payload may indicate the priority of the associated PSSCH.

The retransmission information records for each of the other illustrated PSCCH transmissions (PSCCH2, PSCCH3, . . . , and PSCCHn) may include similar information as discussed supra with respect to the first retransmission information record of row 502. For example, row 504 corresponds to a retransmission information record for a second control channel, e.g., PSCCH2, identified by the corresponding (second) entry in the first column 505. Considering row 504 and various corresponding entries in the respective columns 507 through 515, the second entry in column 507 indicates that a retransmission of the initial/first PSCCH2 transmission may occur in sub-channel 2 of subframe 4. The second entry in column 509 corresponding to row 504 indicates that a retransmission of an associated initial PSSCH (e.g., PSSCH2) transmission may occur in sub-channel 4 of subframe 4. The second entry in column 511 corresponding to row 504 indicates that the initial PSSCH (PSSCH2) transmission associated with PSCCH2 passed CRC, e.g., was successfully decoded by the receiving UE 404. The second entry in column 513 corresponding to the row 504 indicates that a buffer was not assigned to store decoded data for the initial PSSCH2 transmission. The second entry in column 515 corresponding to row 504 indicates that the priority of the initial PSSCH2 transmission associated with PSCCH2 is medium.

The retransmission information records for the other PSCCH transmissions illustrated in the retransmission information 500 may be understood in a similar manner based on the above discussion. As discussed supra in detail, in accordance with one aspect, for a given subframe, the UE 404 may perform PSCCH transmission decode prioritization based on the retransmission information 500. Using the retransmission information 500 (which may be stored at the UE 404), that may indicate retransmission records for various previously detected PSCCH transmissions, the UE 404 may select a PSCCH transmissions in the subframe for decoding. For example, in one configuration, the UE 404 may select a PSCCH transmission at a sub-channel in a given subframe for decoding based on whether one of more of the following conditions are satisfied: i) a PSCCH retransmission is expected on the sub-channel (e.g., the PSCCH transmission on the sub-channel is a retransmission), ii) a valid HARQ buffer was assigned to a previous transmission of an associated PSSCH (e.g., the PSSCH corresponding to the PSCCH), and iii) the previous transmission of the associated PSSCH failed a CRC. As can be appreciated from the above example discussed in connection with FIG. 5, based on the retransmission information 500, the UE 404 may be able to check all the above conditions with respect to a given PSCCH transmission and/or given sub-channel. Thus, in various configurations, the UE 404 may prioritize PSCCH decode at a sub-channel (e.g., select PSCCH transmission on the sub-channel for decoding) based on the knowledge of retransmission information 500. As discussed supra, in some configurations, in addition to being based on the retransmission information 500, the selection of a PSCCH transmission (for decoding) in a subframe may be further based on additional criteria, for example, such as information regarding the transmitter of the PSCCH transmission and/or a scheduling priority history associated with a sub-channel carrying the PSCCH transmission.

Figure 6:
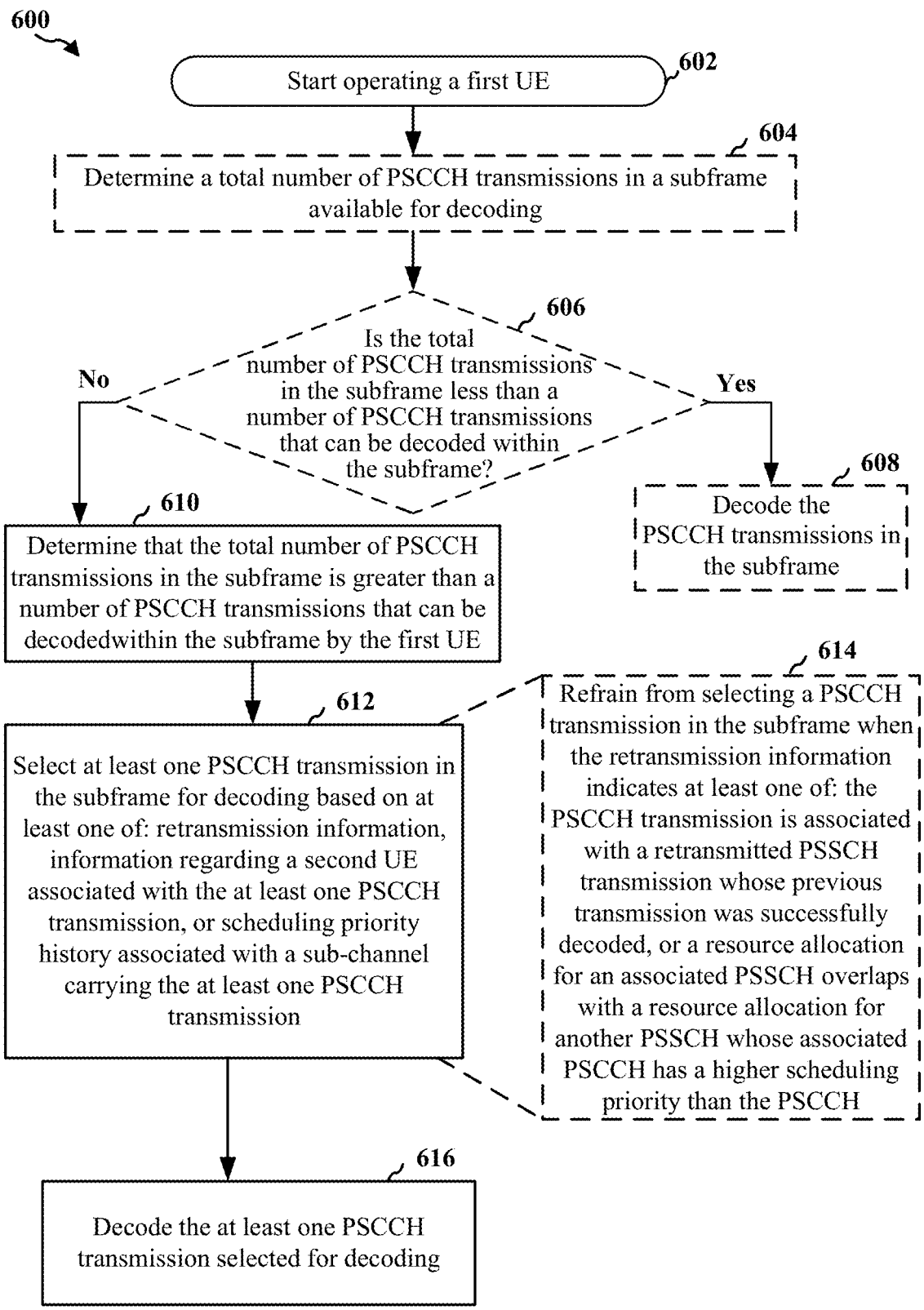
FIG. 6 is a flowchart of an example method of wireless communication.

FIG. 6 is a flowchart 600 of an example method of wireless communication. The example method of flowchart 600 may be used in a wireless communication systems, e.g., device-to device (D2D) and/or V2V and/or V2X type communication systems, where at times devices may have limited control/data channel decoding budget. The method may be performed by a UE (e.g., the UE 104, 350, 404, apparatus 702/702' which may be each be included in or implemented as a vehicle). The UE performing the method of flowchart 600 may be monitoring/scanning resources of a pool to detect/receive control and data channel transmissions from V2V devices, e.g., neighboring UEs, that may transmit V2V/V2X type messages. Based on such scanning over a period of time and decoding of detected control and data channel transmissions, the UE may generate retransmission information (such as retransmission information 500) that may be used in intelligently selecting relatively important control channel (e.g., PSCCH) transmissions and associated data channel (e.g., PSSCH) transmissions in subsequent subframes. In addition, the UE may also utilize information regarding transmitting devices (e.g., which may be obtained from higher layers of the UE) to assess which PSCCH transmission may be more important and/or associated with a higher threat level, and make the PSCCH decoding selection further based on such knowledge. Furthermore, in some configurations, the UE may take into consideration an overall scheduling priority of a sub-channel to make the selection as discussed supra.

The example method of flowchart 600 starts at 602 where the first UE may be initialized to implement the method. In one configuration, various operations discussed below may be performed, e.g., on a per subframe basis, for each subframe in which may the UE may wish to prioritize PSCCH/PSSCH decoding. The subframes may be indicated to the UE via a subframe bitmap from the higher layers.

At 604, the UE (e.g., UE 404) may determine a total number of PSCCH transmissions (on various sub-channels) in a subframe. The subframe and the sub-channels may correspond to the resource pool such as illustrated in FIG. 4. For example, with reference to FIG. 4, the UE 404 may scan the sub-channels corresponding to a given subframe and may detect/receive PSCCH transmissions on various sub-channels corresponding to the subframe.

At 606, the UE may determine whether the total number of PSCCH transmissions detected in the subframe is less than a number of PSCCH transmissions that can be decoded (by the UE) within the subframe. The determination may be based on the UE's decoding capability given the decoding cycle budget which may indicate the maximum number of PSCCH transmission that the UE may decode in a subframe. If at 606 it is determined that the total number of PSCCH transmissions in the subframe is less than a number of PSCCH transmissions that can be decoded within the subframe, the operation proceeds to 608, otherwise the operation proceeds to 610.

In the case where the UE may be able decode (based on the decoding cycle budget) all PSCCH transmissions in the subframe (e.g., due to total number of PSCCH transmissions in the subframe being less than the number of PSCCH transmissions that can be decoded by the UE within the subframe), at 608, the UE may decode the various PSCCH transmissions in the subframe without having to prioritize or prune the PSCCH transmission within the subframe.

At 610, the UE may determine that the total number of PSCCH transmissions in the subframe is greater than the number of PSCCH transmissions that can be decoded within the subframe by the UE. For example, with reference to FIG. 4, the UE 404 may be monitoring the subframe 401 of the resource pool and may receive a number of PSCCH transmissions (e.g., from various different transmitting devices) on various sub-channels within the subframe. Based on the number of PSCCH transmissions detected in the subframe and the knowledge of the number of PSCCH transmissions that the UE may decode within the subframe (e.g., based on the limited decoding cycle budget), the UE may determine that the total number of PSCCH transmissions in the subframe is greater than a number of PSCCH transmissions that may be decoded by the UE. Such a determination (at 610) may trigger the PSCCH decoding prioritization process discussed supra and further discussed below. In an aspect, when such a condition is detected, the UE may be configured to implement PSCCH decoding prioritization and/or pruning (e.g., to determine whether to decode or ignore a PSCCH transmission on a sub-channel) as discussed supra and as briefly discussed again infra.

At 612, the UE may select at least one PSCCH transmission in the subframe for decoding based on at least one of:

retransmission information, information regarding a second UE (e.g., the transmitting UE) associated with the at least one PSCCH transmission, or scheduling priority history associated with a sub-channel carrying the at least one PSCCH transmission. For example, as discussed supra with respect to FIGS. 4 and 5, in various configurations, the UE 404 may be configured to prioritize PSCCH decode at a sub-channel (i.e., select PSCCH transmission on the sub-channel for decoding) based on retransmission information (e.g., such as retransmission information 500) acquired by the UE 404 from previous PSCCH transmissions received and processed by the UE 404. The retransmission information may include retransmission information records corresponding to multiple earlier PSCCH transmissions including retransmission information record associated with a previous/first transmission of the at least one PSCCH transmission. For example, a retransmission information record (such as illustrated in row 502 of FIG. 5) may be generated based on processing/decoding of a first/initial transmission on a first channel (e.g., PSCCH1). Such a retransmission information record is associated with the first/initial PSCCH1 transmission and a retransmission of the PSCCH1 and corresponding PSSCH1 (e.g., the data channel associated with PSCCH1). As discussed supra, the retransmission information record associated with a given PSCCH transmission may include retransmission parameters from a previous transmission of the at least one PSCCH transmission that indicate resources, e.g., sub-channels and/or subframe, that carry a retransmission of the PSCCH (i.e., the at least one PSCCH transmission) and an associated PSSCH transmission. Thus, based on stored retransmission information, the UE may determine whether a given current PSCCH transmission is a new (e.g., first) transmission or a retransmission of a previous PSCCH transmission. If the UE determines that the at least one PSCCH transmission on a given sub-channel is a retransmission of a previous PSCCH transmission (e.g., the at least one PSCCH transmission occurs at a sub-channel where retransmission is expected as may be determined based on the retransmission information), the UE 404 may proceed to determine if one or more additional conditions are satisfied based on the retransmission information. For example, as discussed above supra, in some configurations, the retransmission information may further include information indicating decoding/CRC statistics of a previous transmission of the PSSCH associated with the (current) at least one PSCCH transmission. In one such configuration, based on the decoding/CRC statistics included in the retransmission record the UE may determine whether the previous transmission of the PSSCH failed decoding. The UE may further proceed to determine whether a valid HARQ buffer was assigned to the previous transmission of the associated PSSCH, e.g., to store decoded data (e.g., LLRs) for the PSSCH payload of the previous PSSCH transmission which failed decoding). In an aspect, the UE 404 may be configured select the at least one PSCCH transmission for decoding when it is determined that the at least one PSCCH transmission is a retransmission of a previous PSCCH transmission, the previous transmission of the associated PSSCH failed decoding, and a valid HARQ buffer was assigned for the previous transmission of the associated PSSCH.

In some cases, there may be multiple PSCCH transmissions that may satisfy the above conditions. In such a case, the selection of the at least one PSCCH transmission for decoding may be further based on properties of the associated PSSCH transmission. For example, the at least one PSCCH transmission may be selected for decoding if the UE determines that the associated PSSCH transmission carries a higher priority message, and/or has a larger number of RBs, and/or has a lower starting RB index. Such determination may be made by the UE based on the retransmission information that may indicate the priority of the associated PSSCH transmission, the RB allocation, and the starting RB index information.

In some configurations, the at least one PSCCH transmission may be selected for decoding based on the information regarding the second UE, e.g., the UE that transmitted the PSCCH transmission. Thus, in some configurations, knowledge regarding the transmitting UE may be exploited to determine whether to select a PSCCH transmission in a given subframe for decoding or prune/ignore the PSCCH transmission. As discussed earlier, for a receiving UE, transmissions from different UEs may have different threat levels. The threat levels may be at least partially based on the transmitting UEs location, speed, direction, etc. relative to the receiving UE. For example, a transmitting UE traveling at a very high speed may pose a more serious threat to the UE and thus transmissions (e.g., PSSCH/data messages) from such a UE may be associated with a higher priority. In another example, a transmissions from a UE traveling in the opposite direction with respect to a receiving UE on an undivided street may have a higher priority than transmissions from UEs on the same side. Based on the use of semi-persistent scheduling for V2V/V2X type communications, information from higher layers, and history of previous transmissions received from various UEs, the UE 404 may determine that the at least one PSCCH transmission in the given sub-channel/subframe is from a particular transmitting UE. The UE may further determine if a threat metric of the particular transmitting UE is high (e.g., indicating that transmission from the particular UE may be important and/or has high threat level) or low. In one configuration, the UE 404 may be configured to select the at least one PSCCH transmission for decoding when it is determined that the at least one PSCCH transmission is from a high threat UE. In some configurations, a PSCCH transmission from a low threat transmitting UE may be pruned, e.g., not selected for decoding if there are other PSCCH transmissions from high threat UEs to be decoded. In some configurations, the threat metric of a transmitting UE may be obtained from higher/upper layers (e.g., service layer/MAC layer/ML1).

In some configurations, the at least one PSCCH transmission may be selected for decoding based on the scheduling priority history associated with a sub-channel carrying the at least one PSCCH transmission. For example, as discussed supra, with respect to equations (1), and (2), the UE 404 may analyze scheduling priority history corresponding to the sub-channel carrying the at least one PSCCH transmission and determine an overall scheduling priority of the sub-channel. In one configuration, the UE 404 may be configured to select for decoding the at least one PSCCH transmission (e.g., one or more PSCCH transmissions out of many detected PSCCH transmissions) if it is determined that the sub-channel carrying the at least one PSCCH transmission has frequently carried high priority PSCCH transmissions and has an overall high scheduling priority. With such an approach, the sub-channels in the sub-frame that may have the highest overall high scheduling priority and may have frequently carried (e.g., in the past based on the result of previous decodings) high priority PSCCH transmissions may be prioritized over other available PSCCH transmissions to better utilize available decode cycles and improve power efficiency, reliability and throughput of the UE.

In some configurations, as part of the operation of selecting at least one PSCCH transmission in the subframe, the UE may perform the operation illustrated at block 614. At 614, the UE may refrain from selecting a PSCCH transmission in the subframe for which one or more of the following conditions (that may be checked based on the retransmission information) are satisfied: i) the retransmission information indicates the PSCCH transmission is associated with a retransmitted PSSCH transmission whose previous transmission was successfully decoded, or ii) a resource allocation for an associated PSSCH overlaps with a resource allocation for another PSSCH whose associated PSCCH has a higher scheduling priority than the PSCCH.

Finally, having selected the at least one PSCCH transmission in the subframe, at 616 the UE may decode the selected at least one PSCCH transmission. For example, after determining the one or more sub-channels that may carry PSCCH transmissions that are relatively higher priority than some other transmissions in the subframe in the above discussed manner, the UE may proceed to decode each one of the selected PSCCH transmissions. In various configurations, upon successful decoding of the selected at least one PSCCH transmission, the UE may proceed to decode the PSSCH transmission associated with the least one PSCCH transmission. The method may be repeated for one or more subsequent subframes.

Figure 7:
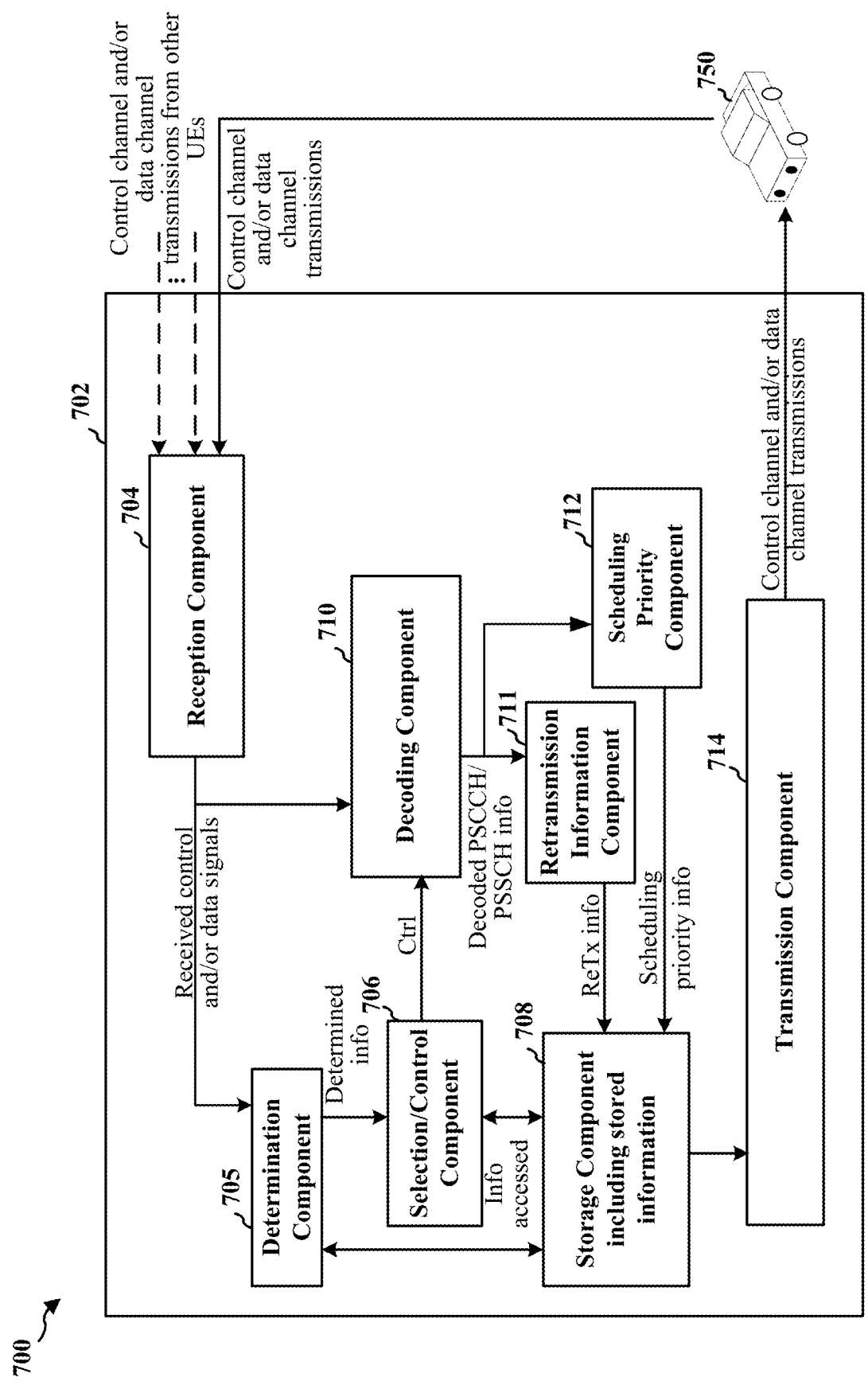
FIG. 7 is a conceptual data flow diagram illustrating the data flow between different means/components in an exemplary apparatus.

FIG. 7 is a conceptual data flow diagram 700 illustrating the data flow between different means/components in an exemplary apparatus 702. The apparatus may be a UE capable of vehicular communications such as, for example, V2V/V2X communications. The apparatus 702 may include a reception component 704, a determination component 705, a selection/control channel component 706, a storage component 708, a decoding component (decoder) 710, a retransmission information component 711, a scheduling priority component 712, and a transmission component 714. The components 707 may each include one or more additional components to perform various operation and functions discussed above with respect to the FIGS. 4-6. The apparatus 702 and the UE 750 may each be a vehicle or a UE included in a vehicle.

The reception component 704 may be configured to receive control signals, data signals, and/or other information described herein from other V2V type devices, e.g., including UE 750 and other UEs, as well as from base stations and other network nodes. Similarly, the transmission component 714 may be configured to transmit control signals, data signals, and/or other information to other devices such as the UE 750, and other devices. The reception component 704 and the transmission component 714 may cooperate to coordinate the communication operations (e.g., reception and transmission) of the apparatus 702.

The messages/information may be received by the reception component 704 in accordance with the methods discussed supra, including the method of flowchart 600. For example, the reception component 704 may receive control and data channel transmissions (e.g., PSCCH and PSSCH transmissions) discussed supra. The received messages/information may be provided to one or more components of the apparatus 702 for further processing and use in performing various operations.

The determination component 705 may be configured to determine a total number of PSCCH transmissions in a subframe available for decoding, e.g., based on the number of PSCCH transmissions detected/received by the reception component 704 while scanning the sub-channels of the given subframe. The determination component 705 may be further configured to determine whether the total number of PSCCH transmissions in the subframe is greater than the number of PSCCH transmissions that can be decoded by the apparatus 702 within the subframe in accordance with the methods discussed supra. The storage component 708 may include stored information that may be used by the apparatus 702 to operate in accordance of the methods described herein including the method of flowchart 600/ For example, the storage component 708 may include stored retransmission information (e.g., ReTx information 500) from various previous PSCCH transmissions received and decoded by the apparatus 702, information regarding various transmitting UEs (e.g., obtained from higher layers or determined based on the priority (e.g., high/low) of earlier messages from the transmitting UEs), and scheduling priority history associated with various sub-channels of a resource pool in which PSCCH/PSSCH transmission are received. In some configurations, the information stored in the storage component 708 may be generated by one or more other components of the apparatus 702, such as, the determination component 705, the decoding component 710, the retransmission information component 711, and the scheduling priority component 712.

For example, the retransmission information component 711 may be configured to generate (e.g., compile/build over time) the retransmission information associated with PSCCH transmissions discussed supra. The scheduling priority history associated with various sub-channels may be based on decoding of prior PSCCH and PSSCH transmissions and may be generated (e.g., compiled/built over time) by the scheduling priority component 712. Furthermore, the scheduling priority component 712 may be further configured to determine overall scheduling priority of various sub-channels in accordance with equations (1) and (2) discussed supra. The determined overall scheduling priority of a sub-channel may be stored along with the scheduling priority history of the sub-channel in the storage component 708.

The selection/control component 706 may be configured to select at least one PSCCH transmission in the subframe for decoding based on at least one of: retransmission information, information regarding a transmitting UE associated with the at least one PSCCH transmission, or scheduling priority history associated with a sub-channel carrying the at least one PSCCH transmission as discussed in detail supra. In various configurations, the selection/control component 706 may access the stored information in the storage component 708 and/or use information obtained directly/indirectly from the determination component 705, the decoding component 710, the retransmission information component 711, and the scheduling priority component 712, to select the at least one PSCCH transmission for decoding. In some configurations, the selection/control component 706 may be further configured to refrain from selecting a PSCCH transmission in the subframe when the retransmission information indicates at least one of: the PSCCH transmission is associated with a PSSCH retransmission whose previous transmission was successfully decoded, or a resource allocation for an associated PSSCH overlaps with a resource allocation for another PSSCH whose associated PSCCH has a higher scheduling priority than the PSCCH. The selection/control component 706 may be further configured to select, for decoding, at least one PSSCH transmission associated with the at least one PSCCH.

The decoding component 710 may be configured to decode the at least one PSCCH transmission selected for decoding by the selection component 706. The decoding component 710 may be further configured to decode at least one PSSCH transmission associated with the selected at least one PSCCH transmission. In some configurations, in an operation stage where the control channel scheduling and prioritization may not have triggered, the decoding component 710 may be decode various PSCCH and PSSCH transmissions received by the apparatus 702. In various configurations, the decoded information may be provided to one or more other components of the apparatus for further processing and/or use in performing other operations in accordance with the described methods. In some configurations, the decoded information corresponding to PSCCH/PSSCH transmissions may be stored in assigned buffers.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
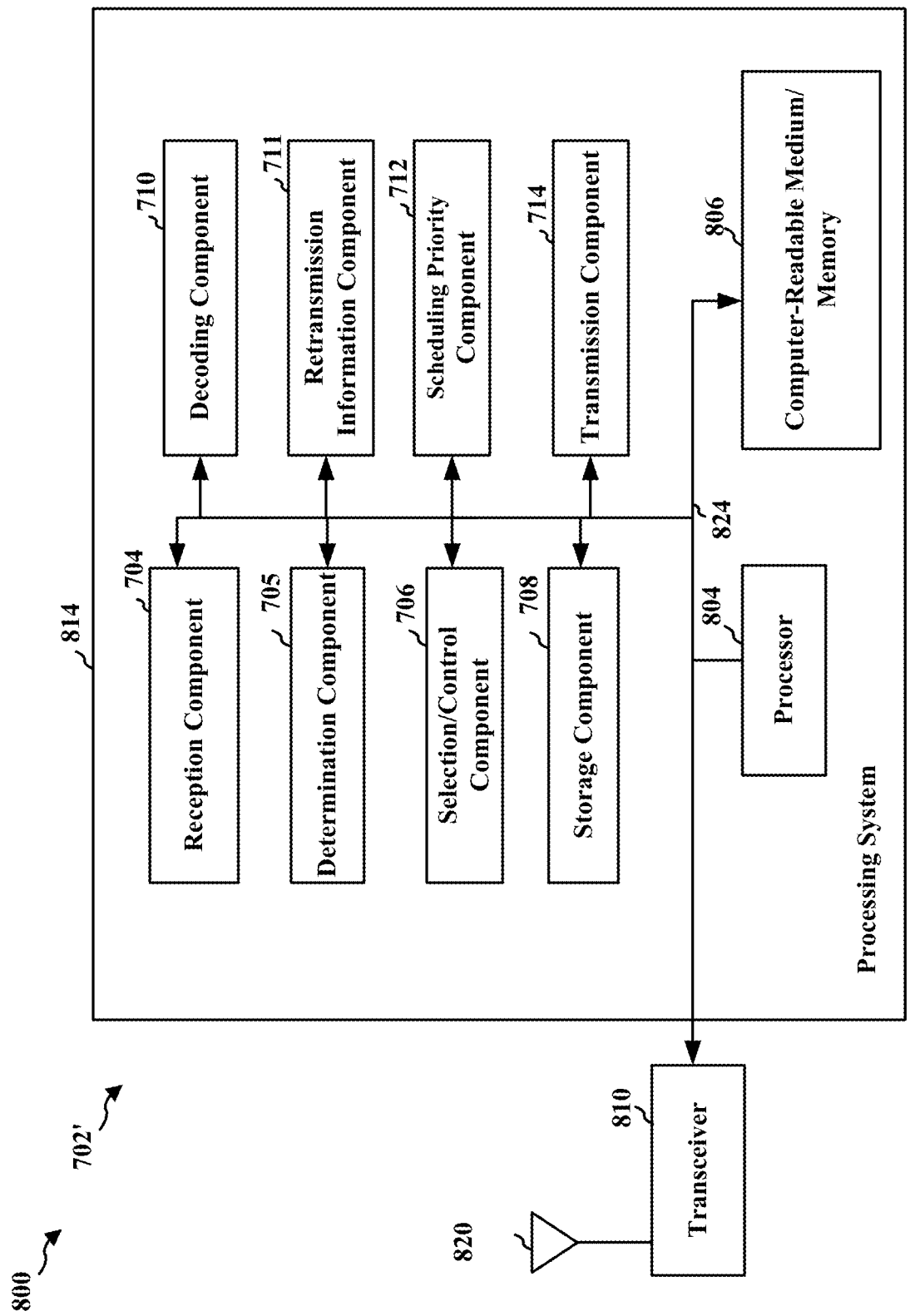
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 705, 706, 708, 710, 711, 712, 714 and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 714, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 705, 706, 708, 710, 711, 712, 714. The components may be software components running in the processor 804, resident/stored in the computer readable medium/memory 806, one or more hardware components coupled to the processor 804, or some combination thereof. The processing system 714 may be a component of the UE 350 and may include the memory 360 and/or at least one of the TX processor 368, the RX processor 356, and the controller/processor 359.

In one configuration, the apparatus 702/702' may include means for determining whether a total number of PSCCH transmissions in a subframe is greater than a number of PSCCH transmissions that can be decoded within the subframe. In some configurations, the means for determining may determine that the total number of PSCCH transmissions in the subframe is greater than the number of PSCCH transmissions that can be decoded within the subframe. The apparatus 702/702' may further include means for selecting at least one PSCCH transmission in the subframe for decoding based on at least one of: retransmission information associated with the at least one PSCCH transmission, information regarding a transmitting UE associated with the at least one PSCCH transmission, or scheduling priority history associated with a sub-channel carrying the at least one PSCCH transmission. The apparatus 702/702' may further include means for decoding the at least one PSCCH transmission selected for decoding.

In one configurations, the retransmission information may indicate resources that carry the at least one PSCCH transmission and an associated PSSCH transmission. In one configuration, the means for determining is further configured to determine that the at least one PSCCH transmission is a retransmission of a previous PSCCH transmission based on the retransmission information.

In one configurations, the means for selecting may be configured to select the at least one PSCCH transmission for decoding based on the retransmission information, where the at least one PSCCH transmission may be selected for decoding when the retransmission information indicates at least one of: the at least one PSCCH transmission is a retransmission of a first PSCCH transmission, a first physical sidelink shared channel (PSSCH) transmission associated with the first PSCCH transmission failed decoding, and unsuccessfully decoded data for the first PSSCH transmission is stored at least as log-likelihood ratios (LLRs) of a payload corresponding to the first PSSCH transmission.

In one configurations, the means for selecting may be configured to select the at least one PSCCH transmission for decoding based on the information regarding the second UE, the at least one PSCCH transmission being selected for decoding when the information regarding the second UE indicates a high threat level associated with the second UE based on at least one of: information about a distance from the second UE, or information about a direction and speed of movement of the second UE.

In one configuration, the means for selecting may be configured to select the at least one PSCCH transmission for decoding based on the scheduling priority history associated with a sub-channel carrying the at least one PSCCH transmission, the at least one PSCCH transmission being selected for decoding when the scheduling priority history indicates that the sub-channel has frequently carried high priority PSCCH transmissions and has an overall high scheduling priority.

In one configuration, the apparatus 702/702' may further comprise means for determining an overall scheduling priority of the sub-channel based on $p_m(n)=C_m(n)/s_m(n)$, where $p_m(n)$ denotes the overall scheduling priority of sub-channel m in subframe n, $C_m(n)$ denotes a priority of sub-channel m in subframe n indicated by higher layers, and $s_m(n)$ is a moving average of $A_m(t)$ observed in subframe n, where $A_m(t)$ indicates whether a new PSCCH transmission is scheduled on the sub-channel m in subframe t.

In one configuration, the means for selecting may be further configured to refrain from selecting a PSCCH transmission in the subframe for decoding when the retransmission information indicates at least one of: the PSCCH transmission is associated with a physical sidelink shared channel (PSSCH) retransmission whose previous transmission was successfully decoded, or a resource allocation for an associated PSSCH overlaps with a resource allocation for another PSSCH whose associated PSCCH has a higher scheduling priority than the PSCCH.

In one configuration, the apparatus 702/702' may comprise a first vehicle and the second UE may comprise a second vehicle in a V2X communication system.

The aforementioned means may be one or more of the aforementioned components of the apparatus 702 and/or the processing system 814 of the apparatus 702' configured to perform the functions recited by the aforementioned means. As described supra, the processing system 714 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a first user equipment (UE), comprising:
   determining that a total number of physical sidelink control channel (PSCCH) transmissions in a subframe is greater than a number of PSCCH transmissions that can be decoded by the first UE within the subframe;
   selecting at least one PSCCH transmission in the subframe for decoding based on a priority of a sub-channel that carries the at least one PSCCH transmission, wherein the priority of the sub-channel is changed over time, and wherein the priority of the sub-channel is based on at least one retransmission information, indicating unsuccessfully decoded data for the first PSSCH transmission that is stored at least as log-likelihood ratios (LLRs) of a payload corresponding to the first PSSCH transmission; and
   decoding the at least one PSCCH transmission selected for decoding.

2. The method of claim 1, wherein the retransmission information is based on one or more previous PSCCH transmissions received by the first UE.

3. The method of claim 1, wherein the retransmission information indicates whether the at least one PSCCH transmission is a retransmission of a previous PSCCH transmission.

4. The method of claim 1, wherein the retransmission information indicates resources that carry the at least one PSCCH transmission and an associated physical sidelink shared channel (PSSCH) transmission.

5. The method of claim 4, wherein the first UE determines that the at least one PSCCH transmission is a retransmission of a previous PSCCH transmission based on the retransmission information.

6. The method of claim 4, wherein the retransmission information further includes information indicating decoding statistics of a previous transmission of the associated PSSCH transmission.

7. The method of claim 1, wherein selecting the at least one PSCCH transmission for decoding based on the priority of the sub-channel comprises selecting the at least one PSCCH transmission for decoding when the retransmission information further indicates at least one of: the at least one PSCCH transmission is a retransmission of a first PSCCH transmission, or a first physical sidelink shared channel (PSSCH) transmission associated with the first PSCCH transmission failed decoding.

8. The method of claim 7, wherein selecting the at least one PSCCH transmission for decoding based on the priority of the sub-channel comprises selecting the at least one PSCCH transmission for decoding further based on at least a priority of a PSSCH transmission associated with the at least one PSCCH transmission.

9. The method of claim 8, wherein the priority of the PSSCH transmission associated with the at least one PSCCH transmission is indicated in the first PSCCH transmission.

10. The method of claim 1, wherein selecting the at least one PSCCH transmission for decoding based on the priority of a sub-channel comprises selecting the at least one PSCCH transmission for decoding further based on at least information regarding the second UE when the information regarding the second UE indicates that a threat level has exceeded a metric associated with the second UE based on at least one of: information about a distance from the second UE, or information about a direction and speed of movement of the second UE.

11. The method of claim 1, wherein selecting the at least one PSCCH transmission for decoding based on the priority of a sub-channel comprises selecting the at least one PSCCH for decoding further based on at least a scheduling priority history associated with the sub-channel carrying the at least one PSCCH transmission, the at least one PSCCH transmission being selected for decoding when the scheduling priority history indicates that the sub-channel has carried PSCCH transmissions having a first priority and has an increased scheduling priority.

12. A method of wireless communication of a first user equipment (UE), comprising:
   determining that a total number of physical sidelink control channel (PSCCH) transmissions in a subframe is greater than a number of PSCCH transmissions that can be decoded by the first UE within the subframe;
   selecting at least one PSCCH transmission in the subframe for decoding based on a scheduling priority history associated with a sub-channel carrying the at least one PSCCH transmission, the at least one PSCCH transmission being selected for decoding when the scheduling priority history indicates that the sub-channel has carried PSCCH transmissions having a first priority and has an increased scheduling priority, wherein the increased scheduling priority of the sub-channel is determined based on $p_m(n)=C_m(n)/s_m(n)$, where $p_m(n)$ denotes the increased scheduling priority of sub-channel m in subframe n, $C_m(n)$ denotes a priority of sub-channel m in subframe n indicated by higher layers, and $s_m(n)$ is a moving average of $A_m(t)$ observed in subframe n, where $A_m(t)$ indicates whether a new PSCCH transmission is scheduled on the sub-channel m in subframe t; and
   decoding the at least one PSCCH transmission selected for decoding.

13. The method of claim 12, wherein selecting at least one PSCCH transmission in the subframe comprises refraining from selecting a PSCCH transmission in the subframe when the retransmission information indicates at least one of: the PSCCH transmission is associated with a physical sidelink shared channel (PSSCH) retransmission whose previous transmission was successfully decoded, or a resource allocation for an associated PSSCH overlaps with a resource allocation for another PSSCH whose associated PSCCH has a higher scheduling priority than a PSCCH associated with the PSCCH transmission.

14. The method of claim 12, wherein the first UE comprises a first vehicle and the second UE comprises a second vehicle in a vehicle-to-everything (V2X) communication system.

15. A first user equipment (UE) for wireless communication, comprising:
   a memory; and
   at least one processor coupled to the memory and configured to:
      determine that a total number of physical sidelink control channel (PSCCH) transmissions in a subframe is greater than a number of PSCCH transmissions that can be decoded by the first UE within the subframe;
      select at least one PSCCH transmission in the subframe for decoding based on a priority of a sub-channel that carries the at least one PSCCH transmission, wherein the priority of the sub-channel is changed over time, and wherein the priority of the sub-channel is based on at least retransmission information indicating unsuccessfully decoded data for the first PSSCH transmission that is stored at least as log-likelihood ratios (LLRs) of a payload corresponding to the first PSSCH transmission; and
      decode the at least one PSCCH transmission selected for decoding.

16. The first UE of claim 15, wherein the retransmission information is based on one or more previous PSCCH transmissions received by the first UE.

17. The first UE of claim 15, wherein the retransmission information indicates resources that carry the at least one PSCCH transmission and an associated physical sidelink shared channel (PSSCH) transmission.

18. The first UE of claim 17, wherein the at least one processor is further configured to determine that the at least one PSCCH transmission is a retransmission of a previous PSCCH transmission based on the retransmission information.

19. The first UE of claim 15, wherein the at least one processor configured to select the at least one PSCCH transmission for decoding based on the retransmission information based on the priority of the sub-channel is further configured to select the at least one PSCCH transmission for decoding when the retransmission information further indicates at least one of: the at least one PSCCH transmission is a retransmission of a first PSCCH transmission, or a first physical sidelink shared channel (PSSCH) transmission associated with the first PSCCH transmission failed decoding.

20. The first UE of claim 15, wherein the at least one processor configured to select the at least one PSCCH transmission for decoding based on the priority of a sub-channel is further configured to select the at least one PSCCH transmission for decoding further based on at least information regarding the second UE when the information regarding the second UE indicates that a threat level has exceeded a metric associated with the second UE based on at least one of: information about a distance from the second UE, or information about a direction and speed of movement of the second UE.

21. The first UE of claim 15, wherein the at least one processor is configured to select the at least one PSCCH transmission for decoding based on the priority of a sub-channel is further configured to select the at least one PSCCH for decoding further based on at least a scheduling priority history associated with the sub-channel carrying the at least one PSCCH transmission, the at least one PSCCH transmission being selected for decoding when the scheduling priority history indicates that the sub-channel has carried PSCCH transmissions having a first priority and has an increased scheduling priority.

22. A first user equipment (UE) for wireless communication, comprising:
   a memory; and
   at least one processor coupled to the memory and configured to:
      determine that a total number of physical sidelink control channel (PSCCH) transmissions in a subframe is greater than a number of PSCCH transmissions that can be decoded by the first UE within the subframe;
      select at least one PSCCH transmission in the subframe for decoding based on a scheduling priority history associated with a sub-channel carrying the at least one PSCCH transmission, the at least one PSCCH transmission being selected for decoding when the scheduling priority history indicates that the sub-channel has carried PSCCH transmissions having a first priority and has an increased scheduling priority, wherein the at least one processor is further configured to determine the increased scheduling priority of the sub-channel based on $p_m(n)=C_m(n)/S_m(n)$, where $p_m(n)$ denotes the increased scheduling priority of sub-channel m in subframe n, $C_m(n)$ denotes a priority of sub-channel m in subframe n indicated by higher layers, and $s_m(n)$ is a moving average of $A_m(t)$ observed in subframe n, where $A_m(t)$ indicates whether a new PSCCH transmission is scheduled on the sub-channel m in subframe t; and decode the at least one PSCCH transmission selected for decoding.

23. The first UE of claim 22, wherein the at least one processor is configured to refrain from selecting a PSCCH transmission in the subframe for decoding when the retransmission information indicates at least one of: the PSCCH transmission is associated with a physical sidelink shared channel (PSSCH) retransmission whose previous transmission was successfully decoded, or a resource allocation for an associated PSSCH overlaps with a resource allocation for another PSSCH whose associated PSCCH has a higher scheduling priority than a PSCCH associated with the PSCCH transmission.

24. A first user equipment (UE) for wireless communication, comprising:
means for determining that a total number of physical sidelink control channel (PSCCH) transmissions in a subframe is greater than a number of PSCCH transmissions that can be decoded by the first UE within the subframe;
means for selecting at least one PSCCH transmission in the subframe for decoding based on a priority of a sub-channel that carries the at least one PSCCH transmission, wherein the priority of the sub-channel is changed over time, and wherein the priority of the sub-channel is based on at least retransmission information indicating unsuccessfully decoded data for the first PSSCH transmission that is stored at least as log-likelihood ratios (LLRs) of a payload corresponding to the first PSSCH transmission; and
means for decoding the at least one PSCCH transmission selected for decoding.

25. The first UE of claim 24, wherein the retransmission information indicates resources that carry the at least one PSCCH transmission and an associated physical sidelink shared channel (PSSCH) transmission.

26. The first UE of claim 24, wherein the means for determining is further configured to determine that the at least one PSCCH transmission is a retransmission of a previous PSCCH transmission based on the retransmission information.

27. The first UE of claim 24, wherein the means for selecting the at least one PSCCH transmission for decoding based on the priority of the sub-channel comprises means for selecting the at least one PSCCH transmission for decoding when the retransmission information further indicates at least one of: the at least one PSCCH transmission is a retransmission of a first PSCCH transmission, or a first physical sidelink shared channel (PSSCH) transmission associated with the first PSCCH transmission failed decoding.

28. The first UE of claim 24, wherein the means for selecting the at least one PSCCH transmission for decoding based on the priority of a sub-channel comprises means for selecting the at least one PSCCH transmission for decoding further based on at least information regarding the second UE the information regarding the second UE indicates that a threat level has exceeded a threshold associated with the second UE based on at least one of: information about a distance from the second UE, or information about a direction and speed of movement of the second UE.

29. The first UE of claim 24, wherein the means for selecting the at least one PSCCH transmission for decoding based on the priority of a sub-channel comprises means for selecting the at least one PSCCH for decoding further based on at least a scheduling priority history associated with the sub-channel carrying the at least one PSCCH transmission, the at least one PSCCH transmission being selected for decoding when the scheduling priority history indicates that the sub-channel has carried PSCCH transmissions having a first priority and has an increased scheduling priority.

30. A non-transitory computer-readable medium of a first UE, the computer-readable medium storing computer executable code, comprising code to:
determine that a total number of physical sidelink control channel (PSCCH) transmissions in a subframe is greater than a number of PSCCH transmissions that can be decoded by the first UE within the subframe;
select at least one PSCCH transmission in the subframe for decoding based on a priority of a sub-channel that carries the at least one PSCCH transmission, wherein the priority of the sub-channel is changed over time, and wherein the priority of the sub-channel is based on at least retransmission information indicating unsuccessfully decoded data for the first PSSCH transmission that is stored at least as log-likelihood ratios (LLRs) of a payload corresponding to the first PSSCH transmission; and
decode the at least one PSCCH transmission selected for decoding.

* * * * *